(12) United States Patent
Miller (10) Patent No.: US 6,422,335 B1
(45) Date of Patent: Jul. 23, 2002

(54) METHOD AND APPARATUS FOR CONTROLLING STEERING FEEL WITH DIAGNOSTICS

(75) Inventor: Joseph D. Miller, Farmington Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/712,548

(22) Filed: Nov. 14, 2000

Related U.S. Application Data (60) Provisional application No. 60/196,259, filed on Apr. 11, 2000.

(51) Int. Cl.[7] .................................................. G06F 7/00
(52) U.S. Cl. ........................................ 180/446; 701/41
(58) Field of Search ............................... 180/446, 443, 180/422, 423; 701/41, 42

(56) References Cited

U.S. PATENT DOCUMENTS

| | | |
|---|---|---|
| 4,574,903 A | 3/1986 | Hashimoto et al. |
| 4,621,327 A * | 11/1986 | Dolph et al. ................ 364/424 |
| 4,660,671 A | 4/1987 | Behr et al. |
| 4,702,335 A | 10/1987 | Cage et al. |
| 4,753,309 A | 6/1988 | Marumoto et al. |
| 4,800,975 A | 1/1989 | Oshita et al. |
| 4,922,427 A | 5/1990 | Yokote et al. |
| 5,027,917 A | 7/1991 | Ohmura |
| 5,360,077 A * | 11/1994 | Nishimoto et al. ......... 180/79.1 |
| 5,473,231 A | 12/1995 | McLaughlin et al. |
| 5,504,403 A | 4/1996 | McLaughlin |
| 5,513,107 A | 4/1996 | Gormley |
| 5,568,389 A | 10/1996 | McLaughlin et al. |
| 5,623,409 A | 4/1997 | Miller |
| 5,743,351 A | 4/1998 | McLaughlin |
| 5,861,725 A | 1/1999 | Endo et al. |
| 5,991,675 A * | 11/1999 | Asanuma ....................... 701/41 |
| 5,992,558 A | 11/1999 | Noro et al. |
| 6,108,599 A * | 8/2000 | Yamamoto et al. ........... 701/41 |
| 6,116,372 A | 9/2000 | Mukai et al. |
| 6,148,951 A * | 11/2000 | Nishi et al. .................. 180/446 |
| 6,293,366 B1 * | 9/2001 | Chabaan et al. ............. 180/446 |

FOREIGN PATENT DOCUMENTS

EP 0947413 A1 10/1999

* cited by examiner

Primary Examiner—Avraham Lerner
(74) Attorney, Agent, or Firm—Tarolli, Sundheim, Covell, Tummino & Szabo L.L.P.

(57) ABSTRACT

An apparatus for controlling a steering assist system (10) of the type having an electric assist motor (28) steerably connected to steerable wheels (24, 26) of a vehicle. The apparatus (10) includes a torque sensor (20) for providing a torque signal indicative of applied steering torque. A steering selector (61) is used to select a desirable amount of steering assist. A vehicle speed sensor (56) is provided for sensing vehicle speed. A main controller (40) controls the steering assist motor (28) in response to the applied steering torque, the sensed vehicle speed, and the steering selector by adding an indexed speed value (60) to the vehicle speed signal in response the selection of the steering selector (61). The main controller (40) includes dynamically varying, vehicle speed dependant tunable parameters. An overseer controller (44) monitors operation of the main controller. The operation of the overseer controller and the main controller are synchronized relative to the vehicle speed so that the overseer (44) accounts for the dynamically varying, vehicle speed dependant tunable parameters of the main controller (40).

5 Claims, 7 Drawing Sheets

METHOD AND APPARATUS FOR CONTROLLING STEERING FEEL WITH DIAGNOSTICS

This application claims the benefit of provisional application No. 60/196 259, filed Apr. 11, 2000.

FIELD OF THE INVENTION

The present invention is directed to an electric assist steering system and is particularly directed to a method and apparatus for selecting steering feel and synchronizing operation between a main controller and an overseer controller for diagnostic purposes.

BACKGROUND OF THE INVENTION

Electric assist steering systems are known in the art. Such systems typically include a steering wheel connected to steerable wheels of the vehicle through appropriate steering linkage, such as through a rack and pinion steering gear. An applied steering torque sensor senses applied steering torque and its output is connected to a controller. An electric assist motor is steerably connected to the steerable wheels. The controller controls energization of the electric assist motor in response to the applied steering torque. Other sensors are also connected to the controller. Such other sensors include a vehicle speed sensor. It is known to control the electric assist motor as a function of the vehicle speed. Speed proportional steering control is known in the art. As vehicle speed increases, steering assist decreases.

Diagnostic arrangements for electric assist steering systems are also known in the art. When an error is sensed in the steering system, the electric assist motor is disabled and manual steering is provided through the mechanical interconnection between the steering wheel and the steerable wheels.

In U.S. Pat. No. 3,983,953, an electric motor is coupled to the input steering shaft and energized in response to the torque applied to the steering wheel by the vehicle operator. The steering system includes a torque sensor and a vehicle speed sensor. A computer receives the output signals provided by both the torque and speed sensors. The computer controls the amount of steering assist provided by the motor dependent upon both the applied steering torque and the sensed vehicle speed.

U.S. Pat. No. 4,415,054 to Drutchas (now U.S. Reissue Pat. No. 32,222,), assigned to TRW Inc., utilizes a D.C. electric assist motor driven through an "H-bridge" arrangement. The assist motor includes a rotatable armature encircling a steering member. The steering member has a first portion with a thread convolution thereon and a second portion with straight cut rack teeth thereon. Rotation of the electric assist motor armature causes linear movement of the steering member through a ball-nut drivably connected to the thread convolution portion of the steering member. A torque sensing device is coupled to the steering column for sensing driver applied torque to the steering wheel. The torque sensing device uses a magnetic Hall-effect sensor that senses relative rotation between the input and output shafts across a torsion bar. An electronic control unit ("ECU") monitors the signal from the torque sensing device and controls the electric assist motor in response thereto. A vehicle speed sensor provides a signal to the ECU indicative of the vehicle speed. The ECU controls current through the electric assist motor in response to both the sensed vehicle speed and the sensed applied steering torque. The ECU decreases steering assist as vehicle speed increases. This is commonly referred to in the art as speed proportional steering.

U.S. Pat. No. 4,660,671 discloses an electric controlled steering system that is based on the Drutchas steering gear. In the arrangement shown in the '671 patent, the D.C. motor is axially spaced from the ball-nut and is operatively connected thereto through a connection tube. The electronic controls includes a plurality of diagnostic features that monitor the operation of the steering system. If an error in the operation of the electric steering system is detected, the power assist system is disabled and steering reverts to an unassisted mode.

U.S. Pat. No. 4,794,997 to North, assigned to TRW Cam Gears Limited, discloses an electric assist steering system having an electric motor operatively connected to the rack through a ball nut. A vehicle speed sensor and an applied steering torque sensor are operatively connected to an ECU. The ECU controls electric current through the motor as a function of both applied steering torque and sensed vehicle speed. The current is controlled by controlling the pulse-width-modulated ("PWM") signal applied to the motor. As the PWM increases, power assist increases. The ECU or computer is preprogrammed with discrete control curves that provide steering assist values (PWM values), also referred to as torque-out values, as a function of applied steering torque, also referred to as torque-in values, for a plurality of predetermined discrete vehicle speed values. Each vehicle speed value has an associated torque-in vs. torque-out control curve.

U.S. Pat. No. 5,257,828 To Miller et al., discloses an electric assist steering system having yaw rate control. This system uses a variable reluctance motor to apply steering assist to the rack member. The torque demand signal is modified as a function of the steering rate feedback.

SUMMARY OF THE INVENTION

An apparatus, in accordance with one exemplary embodiment of the present invention, for controlling a steering assist system of the type having an electric assist motor steerably connected to steerable wheels of a vehicle includes a torque sensor for providing a torque signal indicative of applied steering torque. A steering selector is used to select a desirable amount of steering assist. A vehicle speed sensor is provided for sensing vehicle speed. A controller controls the electric assist motor in response to the applied steering torque, the sensed vehicle speed, and the steering selector by adding an indexed speed value to the vehicle speed signal in response the selection of the speed selector.

An apparatus in accordance with another exemplary embodiment of the invention for controlling a steering assist system having an electric assist steering motor steerably connected to vehicle steerable wheels includes a torque sensor for sensing applied steering torque, a vehicle speed sensor for sensing vehicle speed, and a main controller for controlling the electric assist motor in response to sensed applied steering torque and sensed vehicle speed. The main controller includes dynamically varying, vehicle speed dependant tunable parameters. An overseer controller monitors operation of the main controller. The overseer includes synchronizing means for synchronizing the operation of the overseer controller and the main controller relative to the vehicle speed so that the overseer accounts for the dynamically varying, vehicle speed dependant tunable parameters of the main controller.

A method in accordance with one exemplary embodiment of the present invention is provided for controlling a steering assist system of the type having an electric assist motor steerably connected to steerable wheels of a vehicle. The method comprises the steps of sensing applied steering torque and providing a torque signal indicative of applied steering torque, selecting a desirable amount of steering assist, and sensing vehicle speed and providing a vehicle speed signal indicative of the sensed vehicle speed. The method further includes the steps of controlling the electric assist motor in response to the sensed applied steering torque, the sensed vehicle speed, and the selected steering assist by adding an indexed speed value to the vehicle speed signal in response the selected steering assist.

A method in accordance with another exemplary embodiment of the present invention for controlling a steering assist system having an electric assist steering motor steerably connected to vehicle steerable wheels includes the steps of sensing applied steering torque, sensing vehicle speed, and controlling the electric assist motor with a main controller in response to sensed applied steering torque and sensed vehicle speed. The controller includes dynamically varying, vehicle speed dependant tunable parameters. The method further includes the step of monitoring operation of the main controller with an overseer controller, the overseer controller synchronizing the operation of the overseer controller with the main controller relative to the sensed vehicle speed so that the overseer controller accounts for the dynamically varying, vehicle speed dependant tunable parameters of the main controller.

BRIEF DESCRIPTION OF THE DRAWINGS

Other features and advantages of the present invention will become apparent to those skilled in the art to which the present invention relates from a reading of the following detailed description with reference to the accompanying drawings, in which.

DESCRIPTION OF PREFERRED EMBODIMENT

Figure 1:
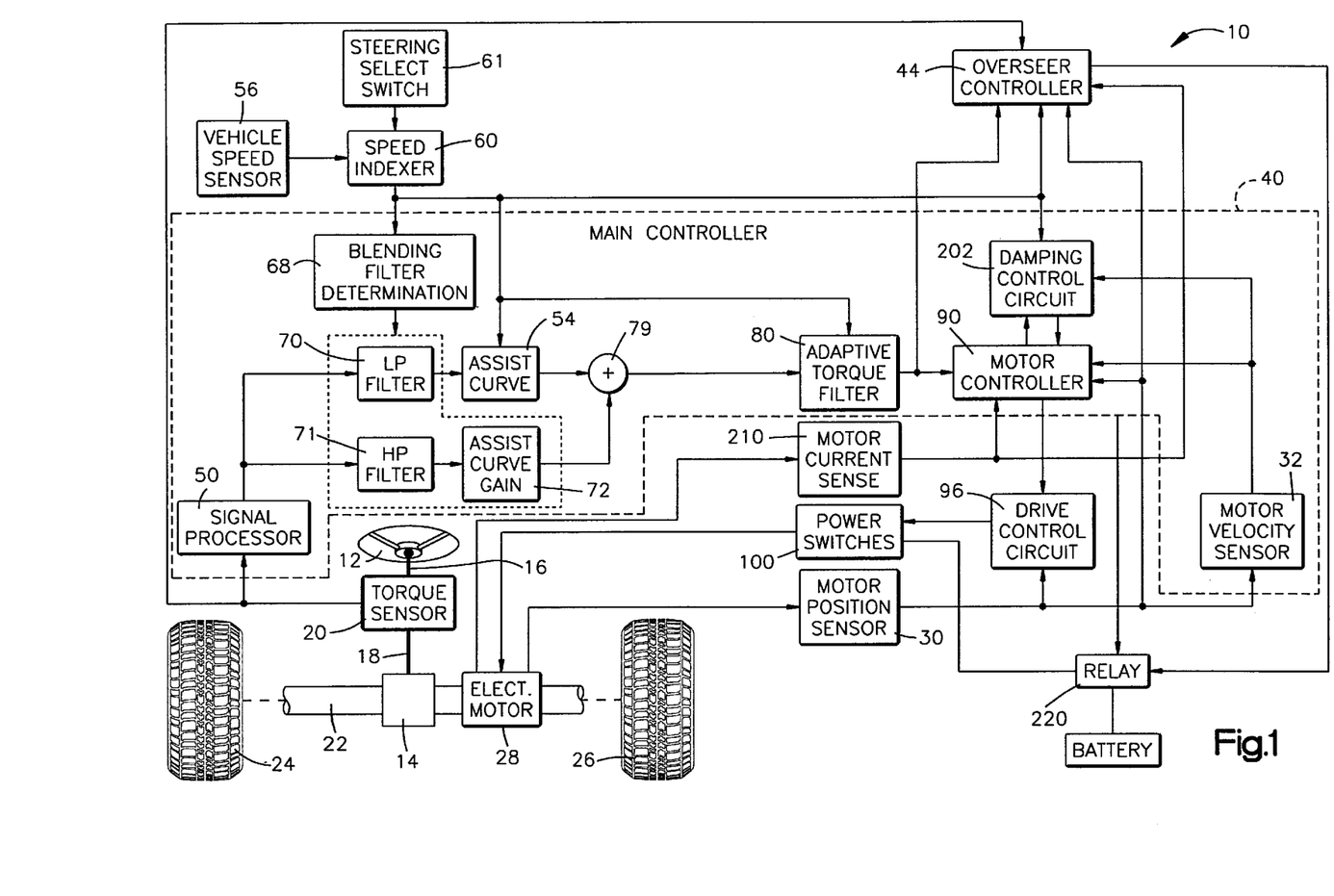
FIG. 1 is a schematic block diagram of an electric assist steering system in accordance with the present invention.

A portion of the control system shown in FIG. 1 is fully described in U.S. Pat. No. 5,504,403 to McLaughlin which is hereby fully incorporated herein by reference.

Referring to FIG. 1, a power assist steering system 10 includes a steering wheel 12 operatively connected to a pinion gear 14. Specifically, the vehicle steering wheel 12 is connected to an input shaft 16 and the pinion gear 14 is connected to an output shaft 18. The input shaft 16 is operatively coupled to the output shaft 18 through a torsion sensor 20. The torque sensor 20 outputs an electric signal having an electrical characteristic indicative of applied steering torque.

The pinion gear 14 is operatively engaged with a rack member 22. The rack member 22 is steerably connected to steerable wheels 24, 26 of the vehicle in a known manner. An electric assist motor 28 is drivably connected to the rack member 22 so that energization of the motor 28 assist the driver in steering movement of the steerable wheels 24, 26 by aiding to move the rack member 22.

In accordance with one exemplary embodiment of the present invention, the electric assist motor 28 is a variable reluctance motor. Any other type of motor may be used such as a permanent magnet AC ("PMAC") motor. The motor 28, in accordance with a preferred embodiment of the present invention, includes eight stator poles and six rotor poles. The stator poles are arranged so as to be energized in pairs designated Aa, Bb, Cc, and Dd.

The operation of a variable reluctance motor and its principle of operation are well known in the art. Basically, the stator poles are energized in pairs. The rotor moves so as to minimize the reluctance between the stator poles and the rotor poles. Minimum reluctance occurs when a pair of rotor poles are aligned with the energized stator poles. Once minimum reluctance is achieved, i.e., when the rotor poles align with the energized stator coils, those energized stator coils are de-energized and an adjacent pair of stator coils are energized.

The direction of motor rotation is controlled by the sequence in which the stator coils are energized. The torque produced by the motor is controlled by the current through the stator coils. When the motor is energized, the rotor turns which, in turn, rotates the nut portion of the ball-nut drive arrangement. When the nut rotates, the balls transfer a linear force to the rack. The direction of rack movement is dependent upon the direction of rotation of the motor.

A motor rotor position sensor 30 is operatively connected to the motor rotor and to the motor housing. Such position sensors are known in the art. One of the functions of the rotor position sensor 30 is to provide an electrical signal indicative of the position of the rotor relative to the motor stator. For proper operation of the variable reluctance motor, including direction of rotation and applied torque, it is necessary to know the position of the rotor relative to the stator. The main controller 40 computes motor velocity 32 from the output of the motor position sensor 30.

A torque sensor 20 is operatively connected across the input shaft 16 and the output shaft 18 and provides an electrical signal having a value indicative of the relative rotational position or relative angular orientation between the input shaft 16 and the output shaft 18. The steering wheel 12 is rotated by the driver during a steering maneuver through an angle $\Theta_{HW}$. The relative angle between the input shaft 16 and the output shaft 18 as a result of applied input torque is referred to herein as $\theta_p$. Taking the spring constant $K_t$ of the torsion bar of the torque sensor into account, the electrical signal from the sensor 40 is indicative of the applied steering torque referred to herein as $\tau_s$.

The torque sensor signal output is connected to a main controller 40 and to an overseer controller 44. The main controller 40 includes a signal processing circuit 50. The processing circuit 50 monitors the angle $\theta_p$ and, "knowing" what the spring constant $K_t$ of the torsion bar provides an electric signal indicative of the applied steering torque $\tau_s$.

The torque sensor signal is passed through a pair of blending filters. The two blending filters are constructed such that the first is a low pass filter 70 and the second is a high pass filter 71. The filters are designed such that summation of the two filters is identically one for all frequencies.

The low pass filter 70 allows all of the signal $\tau_s$ with frequency content below some blending frequency $w_b$ to pass through while rejecting all high frequency data. The high pass filter allows all of the signal $\tau_s$ with frequency content above some blending frequency $w_b$ to pass through while rejecting all low frequency data. The blending filter frequency $w_b$ is a function of vehicle speed and is determined by a blending filter determination circuit 68. The determination of $w_b$ may be accomplished using a look-up table in a microcomputer or may be accomplished using an actual calculation in accordance with a desired control function. The low pass torque sensor output signal $\tau_{sL}$ is connected to an assist curve circuit 54.

The assist curve circuit 54 is preferably a look-up table that provides a desired torque assist signal $\tau_{assist}$ having a value functionally related to the low passed applied steering torque $\tau_{sL}$ and sensed vehicle speed.

A vehicle speed sensor 56 is also operatively connected to a speed indexing circuit 60. A steering feel selection switch 61 is also connected to the speed indexing circuit 60. The steering feel selection switch 61 may have a plurality of feel selection positions. In accordance with one exemplary embodiment of the present invention, the switch 61 has three settings including light, normal, and sport feel. The position of the switch will control how the steering system feels to the driver. The speed indexer adds a predetermined speed value to the speed signal output from the speed sensor 56 in response to the position of the select switch 61. In accordance with one exemplary embodiment of the present invention, in one position, 0 KPH is added, in another, 20 KPH is added, and in the third position, 40 KPH is added. Other values could be used and any other number of selections can be used. The output of the speed indexer, therefore, is the measured vehicle speed plus the index value controlled by the position of the select switch 61.

The output of the speed indexer 60 is connected to the assist curve circuit 54. The assist curve function may be accomplished using a look-up table in a microcomputer or may be accomplished using an actual calculation in accordance with a desired control function.

As is well known in the art, the amount of power assist desired for a vehicle steering system decreases as vehicle speed increases. Therefore, to maintain a proper or desirable feel to steering maneuvers, it is desirable to decrease the amount of steering power assist as the vehicle speed increases. This is referred to in the art as speed proportional steering.

Figure 2:
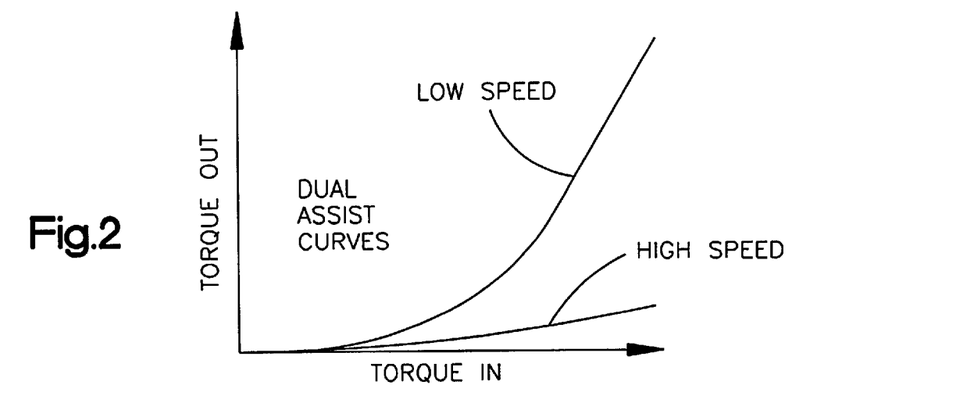
FIG. 2 is a graphical representation of assist control curves used in the system of FIG. 1.

FIG. 2 shows preferred values of output torque $\tau_{assist}$ verses applied input torque $\tau_{sL}$ for a low speed and high speed conditions. The actual value is interpolated between the two curves as a function of the indexed vehicle speed value. Preferably, the $\tau_{ASSIST}$ value is determined according to:

$$\tau_{ASSIST} = S_p \times (LS) + (1 - S_p) \times (HS)$$

where LS is the set of lowest speed $\tau_{ASSIST}$ values for a given low passed input torque, HS is the set of highest speed $\tau_{ASSIST}$ values for a given low passed input torque, and $S_p$ is a speed proportional term that varies between 1 at parking speed and 0 at a predetermined high speed. This provides a smooth interpolation of values as vehicle speed increases.

Figure 3:
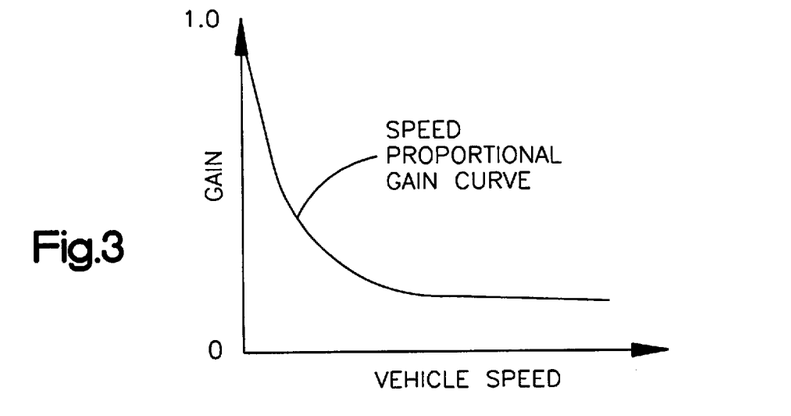
FIG. 3 is a speed proportional gain curve used in the system of FIG. 1.

The high passed torque sensor signal $\tau_{sH}$ is connected to a high frequency assist gain circuit 72. The high frequency assist gain circuit 72 multiplies the high passed torque sensor signal $\tau_{sH}$ by a predetermined gain $S_{cI}$ that is a function related to vehicle speed. The determination of $S_{c1}$ may be accomplished using a look-up table in a microcomputer or may be accomplished using an actual calculation in accordance with a desired control function. Modification of the high frequency assist gain $S_{c1}$ allows the bandwidth of the steering system to be modified. The general shape of curve values for gain as a function of vehicle speed is shown in FIG. 3.

The outputs of the assist curve circuit 54 and the high frequency assist gain circuit 72 are summed in a summing circuit 79. The output of the summing circuit 79 is referred to as $\tau_{ba}$ and is connected to the adaptive filter circuit 80. The two signals are combined to determine the input $\tau_{ba}$ to the adaptive filter circuit.

The indexed vehicle speed signal from indexer 60 is connected to the adaptive torque filter 80. The adaptive filter circuit 80 filters the input blended assist torque signal $\tau_{ba}$. The filter is adaptive in that its poles and zeros are allowed to change as the vehicle speed changes so as to provide an optimal control system. The combination of this filtering is referred to as adaptive blending filtering and results in a filtered torque signal $\tau_m$, which is referred to as the torque demand signal. The torque demand signal is connected to a motor controller 90. The motor controller 90 controls energization of the motor 28 in response to the torque demand signal $\tau_m$. The rotor position sensor 30 is also connected to the motor controller 90 and to the overseer 44. The motor controller 90 controls steering damping in response to sensed rotor speed. Other inputs may be connected to the motor controller 90 such as an ECU temperature sensor, soft-start circuitry, etc., as is known in the art. These signals could also be connected to the overseer 44.

The output of the motor controller 90 is connected to a drive control circuit 96. The drive control circuit is controllably connected to a plurality of power switches 100 to control the application of electrical energy to the electric assist motor 28. The power switches controllably connect a source of electrical energy, such as the vehicle battery, through a relay circuit 220 to the motor 28. The main controller 40 and the overseer 44 controls operation of the relay as will be described below. The output from the rotor position sensor 30 is also connected to the drive control circuit 96. As mentioned above, control of a variable reluctance motor requires that the relative position between the rotor and the stator be known.

Figure 4:
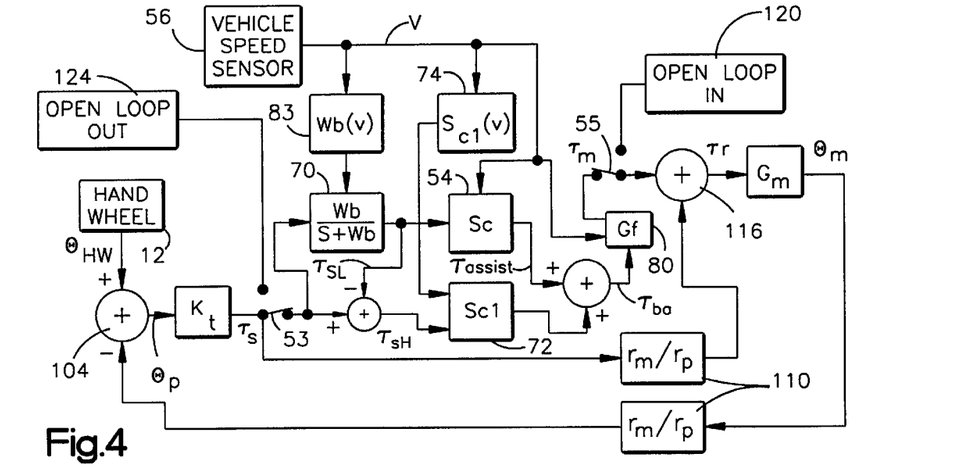
FIG. 4 is a schematic drawing representation of a linearized closed loop control system.

Referring to FIG. 4, the linearized closed loop control system of the present invention is shown. The linearized closed loop control system is required because it is used to design the blending filter and adaptive filter for the steering system. Rotation of the hand wheel 12 results in an angular displacement of $\Theta_{HW}$ on the steering wheel side of the torsion bar position sensor. This angular displacement is differenced 104 with the resultant angular displacement of the output shaft 18 after it is driven in rotation by the electric assist motor by an angle $\Theta_m$ through the gearing ratio 110 represented by $r_m/r_p$ where $r_m$ is the effective radius of the motor ball nut and $r_p$ is the effective radius of the pinion. In one embodiment of the present invention, the values are $r_m = 0.05$ in. and $r_p = 0.31$ in. One radian of rotation of the ball nut produces $r_m$ inches of travel of the rack. Similarly, one radian of rotation of the pinion produces $r_p$ inches of travel of the rack. The resultant angular displacement $\Theta_p$ times the spring constant $K_t$ gives the torque signal $\tau_s$. In the closed loop arrangement, switch 53 connects the output $\tau_s$ to the low pass/high pass filter circuits.

The torque signal $\tau_s$ is passed through the low pass filter 70 resulting in the low passed assist torque $\tau_{sL}$. The high passed assist torque $\tau_{sH}$ is determined by subtracting the low frequency assist torque from the torque signal $\tau_s$. The reason that $\tau_{sH}$ can be determined in this way is discussed below.

The continuous domain blending filters are chosen such that the sum of the low pass filter $G_L(S)$ and the high pass filter $G_H(S)$ is always equal to one:

$$G_L(S)+G_H(S)=1$$

In accordance with an exemplary embodiment of the present invention, the low pass filter is chosen to be a first order filter with a pole at $w_b$. The high pass filter is uniquely defined by the above constraint that the sum of the two filters must be one. Therefore, the low and high pass filters are:

$$G_L(S) = \frac{w_b}{S+w_b}$$

$$G_H(S) = \frac{S}{S+w_b}$$

When realizing a set of blending filters in a digital computer, those skilled in the art will appreciate that it is not necessary to construct separate high and low pass filter stages. Rather, the input to the blending filters $\tau_s$ is passed through the low pass filter resulting in the signal $\tau_{sL}$. The high passed signal is the original input torque minus the low passed portion:

$$\tau_{sH}=\tau_s-\tau_{sL}$$

This can be thought of equivalently as determining the low frequency portion of the signal and simply subtracting it out of the original signal. The result is a signal with only high frequency information. Alternatively, one can use higher order blending filters. However, the complexity of the filter computations increases with filter order in a digital computer. The use of first order filters is preferred.

The low passed torsion bar torque signal $\tau_{sL}$ is connected to the assist curve circuit 54. Referring again to FIG. 4, the linearized control system includes an assist curve circuit 54 designated as a gain $S_c$. The gain $S_c$ is the local derivative of the assist function with respect to the input torque evaluated at some low passed input torque and speed.

$$S_c = \frac{\partial \tau_{ASSIST}}{\partial \tau_{sL}}$$

The gain $S_c$ represents how much incremental assist $\tau_{ASSIST}$ is provided for an incremental change in low passed input torque $\tau_{sL}$ about some nominal low passed input torque and vehicle speed. For example, the low speed assist curve in FIG. 2 has a shallow slope as the torque is increased out of the deadband and a steeper slope at a high input torque of 25 in-lb. Therefore, the gain $S_c$ is small near the deadband and increases as the torque increases away from the deadband. The difference in slope is even greater for the high speed assist curve of FIG. 2. For a low passed input torque of 10 in-lb., a large change in low passed input torque is required to effect even small changes in assist torque. Therefore, $S_c$ is small. For an input torque of 50 in-lb., a small change in low passed input torque produces a large change in assist torque. For the high speed assist curve, $S_c$ is very small near the deadband and very large at 50 in-lb. of low passed input torque.

In the linearized realization of the steering system, the low passed torque $\tau_{sL}$ is multiplied by the local gain of the assist curve to determine $\tau_{ASSIST}$. The low passed assist value $\tau_{ASSIST}$ is summed with the high passed assist value. The high passed assist value is determined by multiplying the high passed torque sensor signal $\tau_{sH}$ times the high frequency assist gain $S_{c1}$. The blended assist is:

$$\tau_{ba}=\tau_{ASSIST}+((S_{c1})\times(\tau_{sH})$$

The pole of the blending filter $w_b$ and the high frequency assist gain $S_{c1}$ are computed as functions of speed in circuits 83 and 74 respectively. The determination of $w_b$ and $S_{c1}$ may be accomplished using a look-up table in a microcomputer or may be accomplished using actual calculations. The circuits 83 and 74 in the linearized closed loop transfer function of FIG. 4 form the blending filter determination circuit 68 of FIG. 1. The blended assist is connected to the adaptive torque filter $G_f$. The adaptive torque filter allows the vehicle steering system to adapt to changes in the dynamics of the system that occur as the vehicle speed changes.

The output from the adaptive torque filter 80 is a torque demand signal $\tau_m$. In the closed loop arrangement, switch 55 connects $\tau_m$ to the summing circuit 116. The motor provides a torque assist which is summed with the manual assist transmitted through the pinion shaft producing a total torque $\tau_r$ on the rack. This torque is applied to the transfer function $G_m$ which represents the dynamics of the steering gear. The input to $G_m$ is the total torque applied to the motor via the rack and ball nut from the input pinion and the motor and the output is the motor rotation angle. The transfer function $G_m$ is referenced directly to the motor so that the input is the total torque on the motor and the output is motor angle. The restoring force applied by the tires on the rack is modeled as a spring force which is not shown because it is internal to $G_m$.

Three key features of the blending filter topology should be appreciated. If the local assist gain $S_c$ is equal to the high frequency assist gain $S_{c1}$, the blended assist torque $\tau_{ba}$ is identically equal to the measured torque $\tau_s$ times the gain $S_{c1}$. This results from the fact that the sum of the low passed and high passed filters is equal to one. If the outputs of the two filters are multiplied by the same gain, the sum of the two outputs will just be the gain times the inputs. This characteristic of the blending filter topology is used when designing a controller for the steering system. Also, the low frequency or DC gain of the filter stage between the measured torsion bar torque $\tau_s$ and the blended assist torque $\tau_{ba}$ is set by the local gain of the assist curve $S_c$. This occurs because the output of the high pass filter stage 71 is zero for low frequency inputs so that all of the torque sensor signals pass through the low pass filter. Since the assist curve is a nonlinear element providing different incremental levels of assist for the same increment change in input torque, i.e., $S_c$ changes in response to input torque and vehicle speed, the DC gain of the steering system is entirely selectable and tunable by changing the assist curve. Furthermore, the high frequency gain of the filter stage between the measured torsion bar torque $\tau_s$ and the blended assist torque $\tau_{ba}$ is always $S_{c1}$. At high frequency, the output of the low pass stage of the blending filter is zero so that all of the torque sensor signal passes through the high pass filter stage. Since the high frequency gain of the high pass stage is $S_{c1}$, the gain between $\tau_s$ and $\tau_{ba}$ is $S_{c1}$.

The blending filters, in accordance with the present invention, have the unique characteristic of responding like a linear system to a high frequency input signal and like a nonlinear system to a low frequency input signal. For example, if the steering torque signal changes rapidly, as might occur due to torque ripple from the VR electric assist motor 28, the driver inputting a rapid input torque, or the wheels responding to a sudden bump in the road, the high frequency inputs are rejected by the low pass filter 70 and the response of the system would be dominated by the high pass portion of the loop under these steering conditions. However, if the input to the system-is smooth and slow, then the high pass filter rejects the low frequency input and the system response is dominated by the non-linear assist curve. The system is both responsive to fast inputs and can achieve any feel or assist curve for low frequency inputs.

The filter $G_f$, in accordance with a preferred embodiment, is a constant filter that is not a function of vehicle speed. The present invention contemplates that this filter $G_f$ would be an adaptive filter that adapts as a function of vehicle speed. It is designed by measuring the open loop transfer function $G_p$ as a function of speed and designing a filter that meets stability and performance specifications for all speeds. In accordance with one embodiment of the present invention, the open loop transfer functions are designed to have the same bandwidth for all speeds. The present invention is not, however, so limited, i.e., the steering system bandwidth can vary as a function of vehicle speed.

Figure 6A:
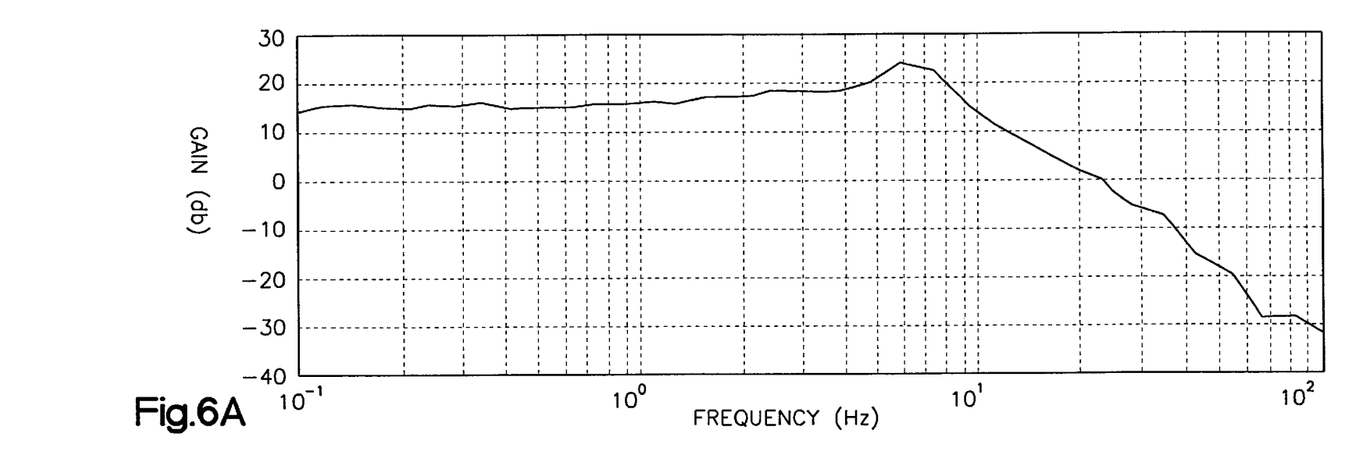
FIGS. 6A and 6B are a Bode plot of an open loop system.
Figure 6B:
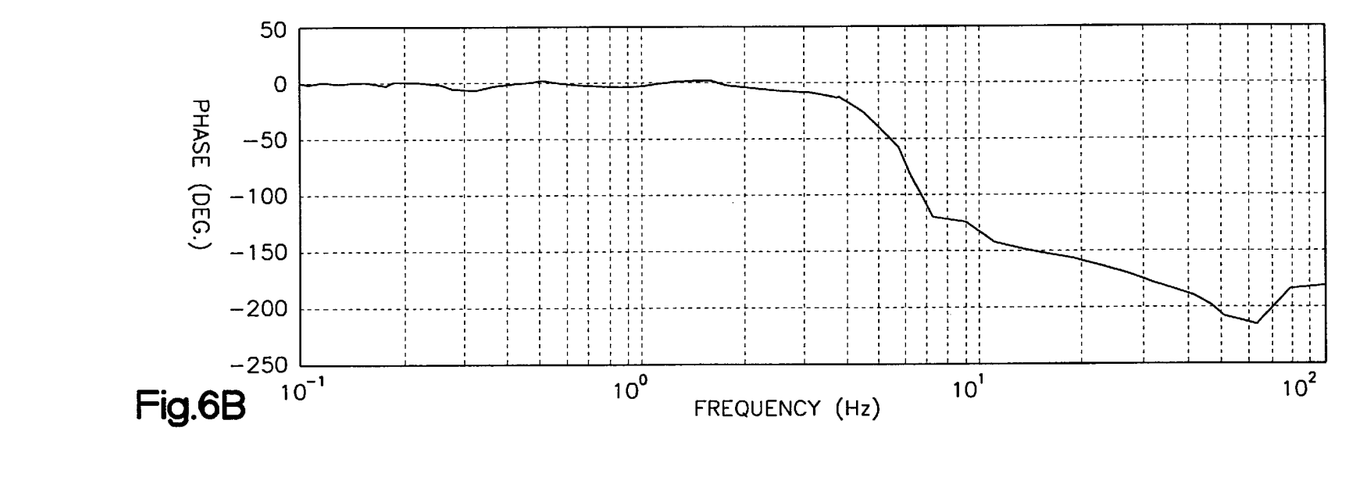

One skilled in the art will appreciate that controller design requires that the system dynamics must be identified prior to designing of the controller. Specifically, it is necessary to identify dynamics of the open loop transfer function. The open loop transfer function, for the purposes of this application, occurs when the motor command $\tau_m$ is used as the input and the measured torque sensor signal $\tau_s$ is the output. To establish such an open loop system, switches 53 and 55 are switched so as to remove the assist curves, blending filters, and the adaptive torque filter from the system. The transfer function is measured on a vehicle for a particular system using a signal analyzer to command the motor at various input frequencies and measuring the output of the torque sensor with the hand wheel held in a fixed position. This measured transfer function is designated as $G_p$ and an example of such is shown in FIGS. 6A and 6B. (The actual values are dependent upon the particular vehicle application.) This measured open loop transfer function is then used to design the adaptive torque filter 80 so that the steering torque loop has a desired stability and performance characteristics.

One skilled in the art will appreciate that the open loop transfer function $G_p$ can also be determined by creating a linear model of the dynamics of the rack, tires, motor, ball nut, electronics, etc. If $G_p$ is determined from an analytical model, then all of the dynamics involved in converting a torque command at the motor to a measured torsion bar signal must be included in the model. It is preferred to measure this transfer function directly as analytical models rarely match real world phenomenon exactly especially with regard to the phase angle of the transfer function.

The transfer function shown in FIG. 6 was measured with the vehicle stationary on a dry, flat surface. This is commonly referred to as "dry park." The hand wheel was locked. Any controller designed using this measured transfer function will work well at dry park. As the vehicle speed increases, the controller may not function as desired since the open loop transfer function may change. The open loop transfer function is preferably measured at several different vehicle speeds and the filters are designed for each of these speeds. The vehicle speed is measured in real time and the corresponding filter is used in the control determination. The control system's torque filter "adapts" to steering dynamic changes as a function of vehicle speed. To measure the open loop transfer function as a function of vehicle speed is difficult. Alternatively, the open loop transfer function at dry park can be measured and used to develop a model that correlates well to the measured data. The model can then be used to determine the open loop transfer function at higher vehicle speeds.

Although the preferred embodiment of the present invention allows the adaptive filter to change as the dynamics of the steering system change, only the dry park condition transfer function shown in FIG. 6 is used to illustrate the design process. Once the steps required for dry park are understood, torque filters can be designed for different vehicle speeds.

Torque filter design is performed using classical open loop techniques. The open loop steering system transfer function $G_p$ is measured and is shown in FIG. 6. The open loop transfer function that must be stabilized includes not only $G_p$, but also any gain due to the assist curve. From a stability point of view, the system must be stable for the case of the highest system gain:

$$S_c = (S_c)_{max}$$

Next, set both the assist curve gain 54 equal to $(S_c)_{max}$ and the high frequency assist gain 72 equal to $(S_c)_{max}$. Since the sum of the blending filters is always one, this is equivalent to the blending assist torque $\tau_{ba}$ being equal to the input torsion bar torque $\tau_s$ multiplied by $(S_c)_{max}$, i.e., $$\tau_{ba} = \frac{w_b}{S+w_b}\tau_s(S_{cl})_{max} + \left[\tau_s - \frac{w_b}{S+w_b}\tau_s(S_{cl})_{max}\right]$$

$$\tau_{ba} = \left[\frac{w_b}{S+w_b} + 1 - \frac{w_b}{S+w_b}\right]\tau_s(S_{cl})_{max}$$

The gain $(S_c)_{max}$ becomes part of the open loop transfer function. A filter is then designed for the open loop system $(G_p \times (S_c)_{max})$ to achieve performance and stability requirements. In one embodiment of the invention, the maximum assist gain $(S_c)_{max}$ is 5.

Figure 5A:
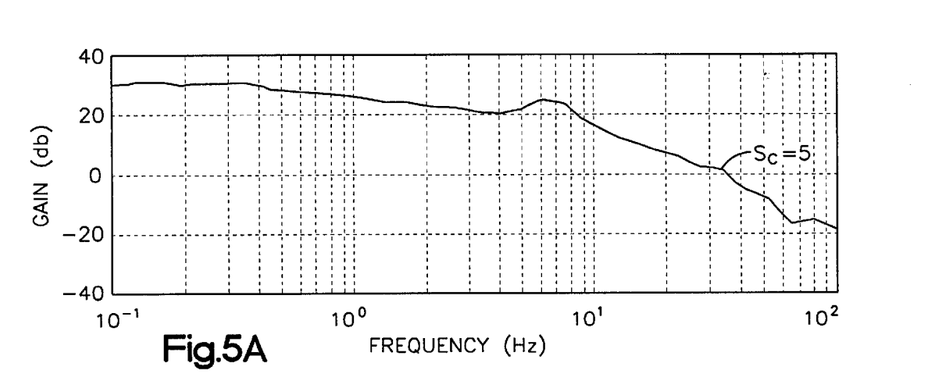
FIGS. 5A and 5B are a Bode plot of an open loop. system using a fixed torque filter.
Figure 5B:
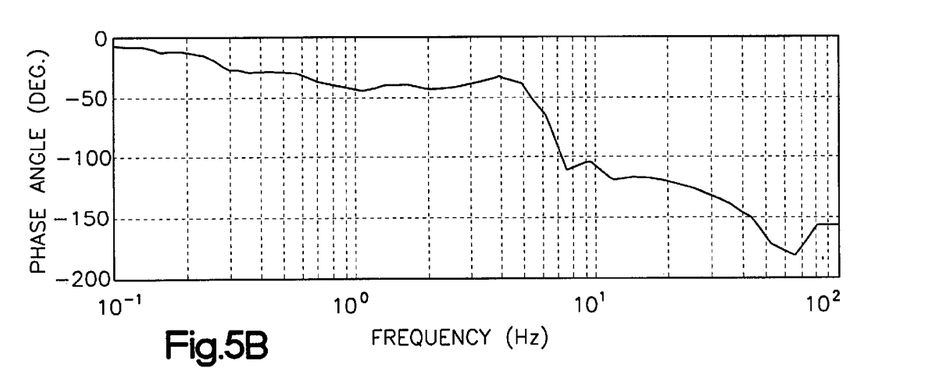

One skilled in the art will appreciate from FIGS. 5A and 5B that if a gain of 5 (or 14 db) is added to the gain portion of the Bode plot, the system will have insufficient stability margins. Therefore a filter is added to the open loop system to achieve desired performance and stability objectives. In accordance with a preferred embodiment, a filter of the form:

$$G_f = \frac{(S+40)^2}{(S+4)\times(S+400)}$$

is used. The filter $G_f$ is a lag-lead type filter that is designed to provide a system with adequate performance and stability margins at a maximum steering system gain of 5. It can be seen from FIGS. 5A and 5B that for a gain of $S_c=5$, the system has approximately 10 db of gain margin, and 35 degrees of phase margin. The open loop transfer function shown includes three quantities that describe the behavior of the open loop steering system: (i) the maximum local assist curve gain $(S_c)_{max}$, (ii) the torque filter $G_f$, and (iii) the measured transfer function $G_p$.

Figure 7A:
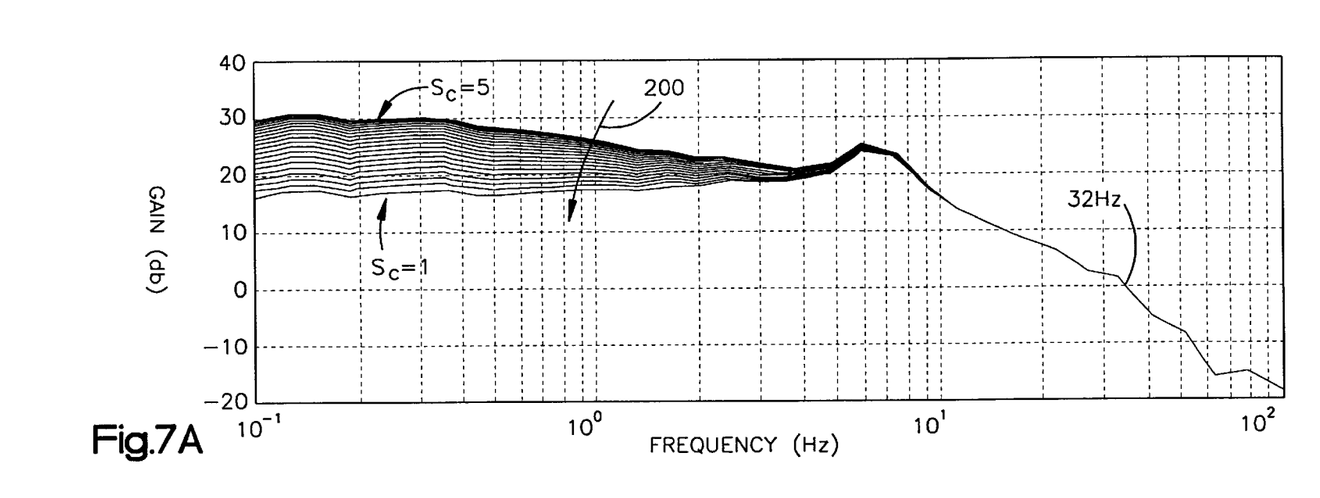
FIGS. 7A and 7B are a Bode plot of an open loop system having gains between 1 and 5.
Figure 7B:
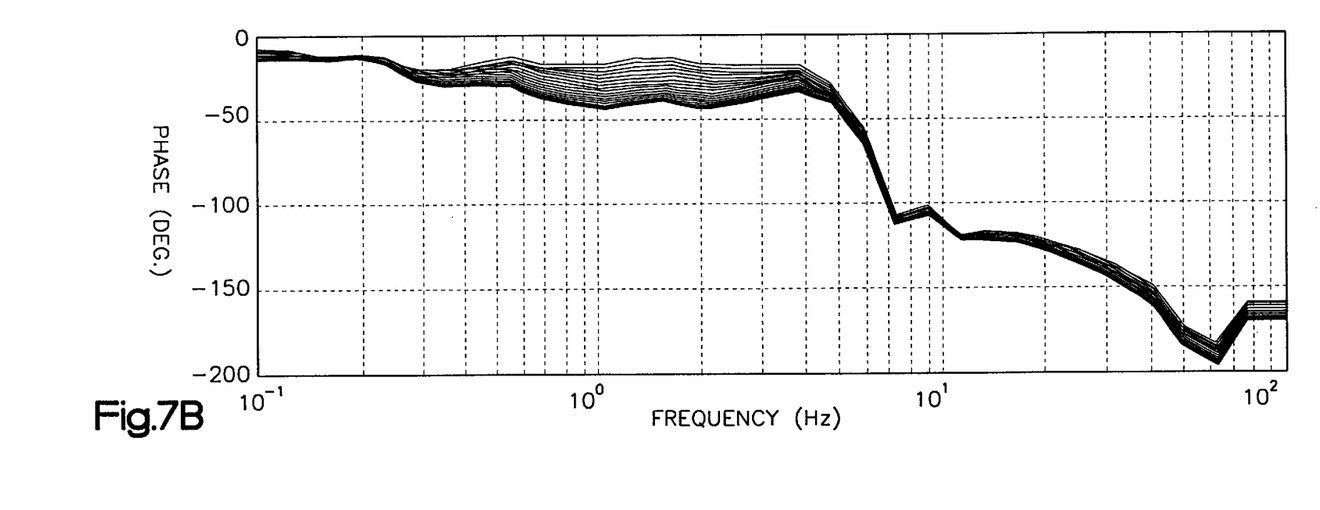

Since the torque filter is designed to accommodate the maximum gain of the assist curve, the system will always be stable for assist curve gains below $(S_c)_{max}$. In actual operation of the steering system, the gain of the assist curve circuit $S_c$ can change from low values all the way up to $(S_c)_{max}$. FIGS. 7A and 7B illustrate the open loop transfer function of a steering system for gains of $1 < S_c < 5$. The open loop transfer function $G_{c1}$ as shown includes the measured steering system transfer function $G_p$, the torque filter designed for the maximum assist gain $G_f$, and the effects of the blending filter. $G_{ba}$ is defined as the transfer function from the torsion bar measured torque $\tau_s$, to the blended assist torque $\tau_{ba}$:

$$\tau_{ba} = \left[\frac{w_b}{S+w_b}(S_c) + \left(1 - \frac{w_b}{S+w_b}\right)\right]\tau_s$$

The open loop transfer function shown in FIG. 7 are $$G_{c1} = G_p G_f G_{ba}$$

In FIG. 7, the gain $S_{c1}$ is set to 5 which is the same as $(S_c)_{max}$ in the preferred embodiment of the present invention. The gain $S_c$ is the local gain of the assist curve circuit for some nominal input torque and vehicle speed. The zero frequency or DC gain of the open loop transfer function $G_{c1}$ is $S_c$ and all of the transfer functions cross over the zero db line (referred to as the crossover frequency) at 32 Hz. This indicates that all curves have the same bandwidth or time domain response characteristics yet all have different DC or low frequency response due to the blending filter and the assist curve circuit 54.

Figure 8A:
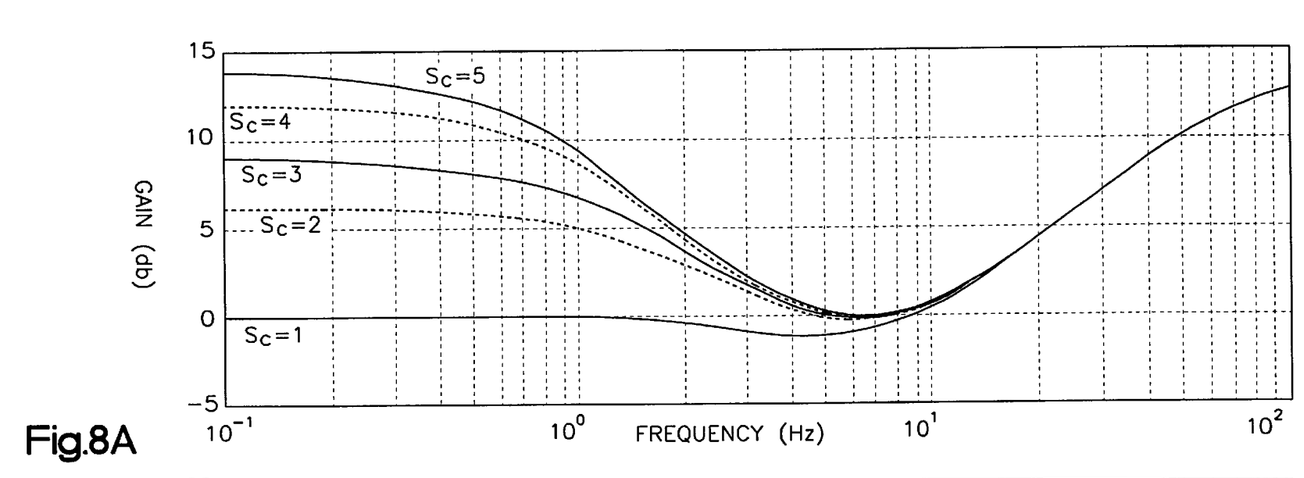
FIGS. 8A and 8B are a Bode plot of the adaptive blending filter for various steering system gains.
Figure 8B:
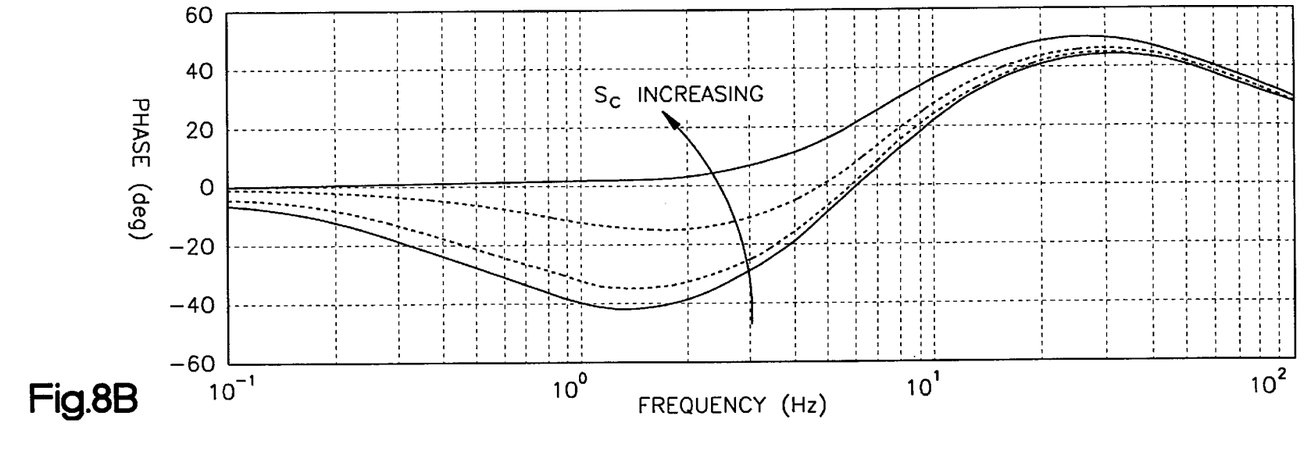

FIGS. 8A and 8B illustrate the transfer function $G_f G_{ba}$. The zero frequency or DC gain of the transfer function is always $S_c$ and yet the high frequency gain is $S_{c1}$. The use of the blending filters has allowed the DC response characteristic of the compensation to be different from the high frequency gain characteristics. This characteristic of the blending filters allows the system to have any desired feel via speed-pro for low frequency inputs, and yet be very responsive to quick steering inputs.

Referring to FIGS. 6A and 6B, it can be seen that if the gain at 32 Hz is reduced in the open loop transfer function, the bandwidth of the steering system will also be reduced. Because of the blending filters, the high frequency gain can be reduced by setting $S_{c1}$ to a lower value. Since the high frequency assist gain is a function of vehicle speed, the bandwidth of the steering system at high speed can be reduced if necessary by reducing $S_{c1}$ as a function of speed.

Figure 9A:
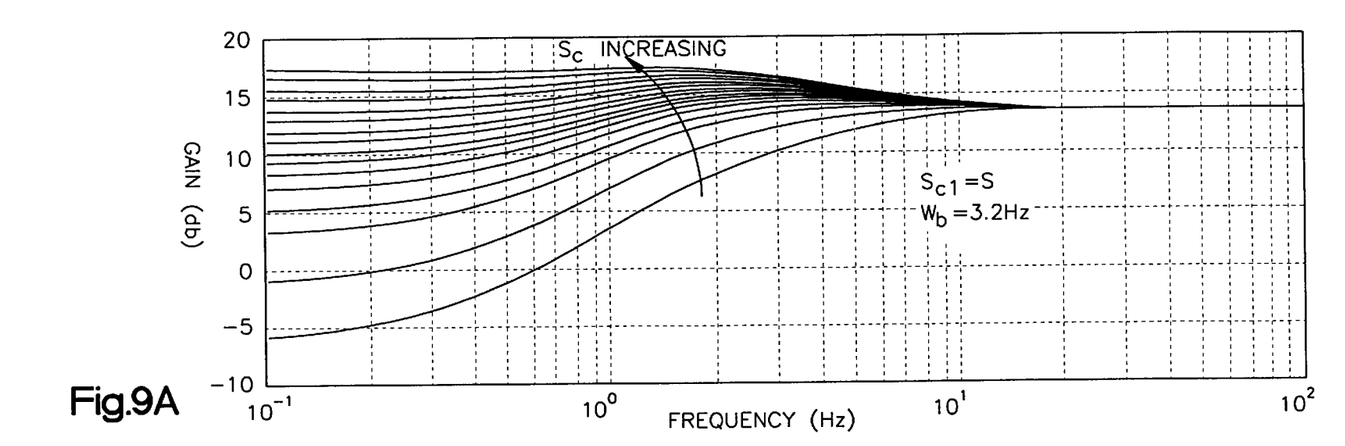
FIGS. 9A and 9B are a Bode plot of the blending filter for various steering system gains.
Figure 9B:
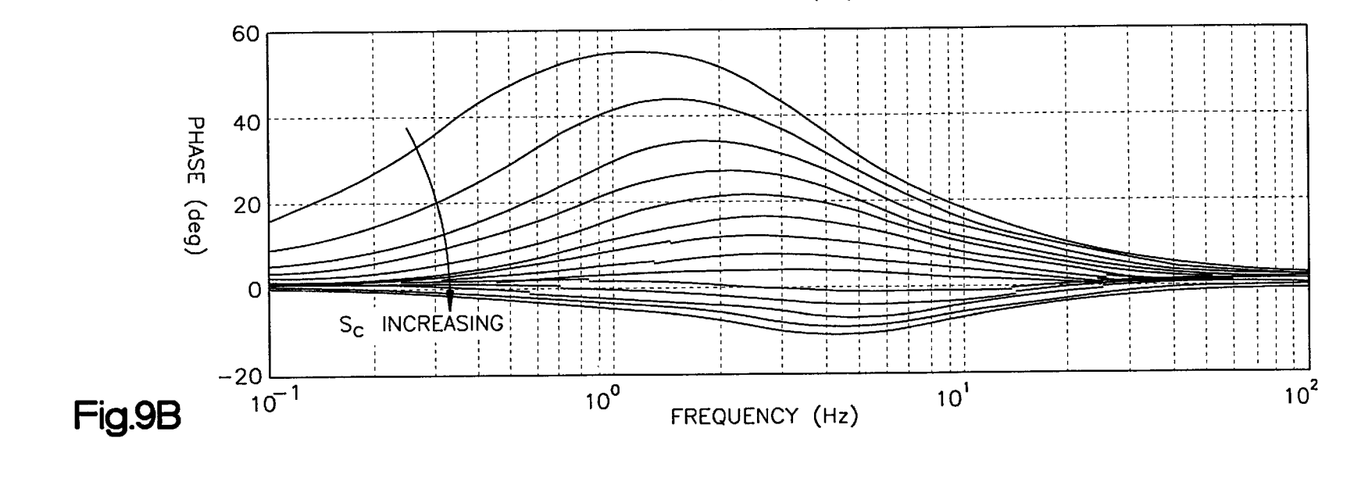

In accordance with one exemplary embodiment of the present invention, the blending filter pole $W_b$ is chosen to be about 1 decade less than the crossover frequency of 32 Hz, i.e., 3.2 Hz. FIGS. 9A and 9B illustrates the frequency response for the transfer function $G_{ba}$. The gain $S_c$ increases from 0.5 to 8 at increments of 0.5. The high frequency assist gain $S_{c1}$ is set equal to 5. For the case shown, the maximum assist gain is higher than the high frequency assist gain. The steering control system does not suffer from either performance nor stability problems when $S_{c1}$ is greater than $S_{c1}$ because there is no large gain or phase change at the zero db crossover frequency of 32 Hz. so the stability margins of the steering system have not changed. The DC gain of $G_{ba}$ is $S_{c1}$ and the high frequency gain is $S_{c1}$.

As long as the blending frequency is approximately one decade lower than the high gain crossover frequency (as designed for the case of maximum assist gain), the system will always be stable as long as the local gain is not much greater than the gain $S_{c1}$. It is also possible to independently lower the crossover frequency of the system at any vehicle speed by lowering $S_{c1}$ as the vehicle speed increases.

Those skilled in the art will appreciate that the low pass blending filters and the adaptive torque filter are realized in a digital computer as digital filters using pole-zero mapping. Basically, the poles P and zeros Z of the continuous system are mapped to the poles p and zeros z of the discrete digital filter via:

$$p = \exp(Pt), \text{ and } z = \exp(Zt)$$

where exp is the natural exponent and t is the sample rate. The sample rate of the digital filters, in accordance with one embodiment of the present invention, is approximately 300 micro-seconds. With pole zero mapping, the digital filter is then "forced" to have the same gain DC as the continuous filter.

Those skilled in the art will appreciate that the blending and adaptive torque filters will maintain a selectable system bandwidth independent of vehicle speed and assist curve gain changes.

Figure 10:
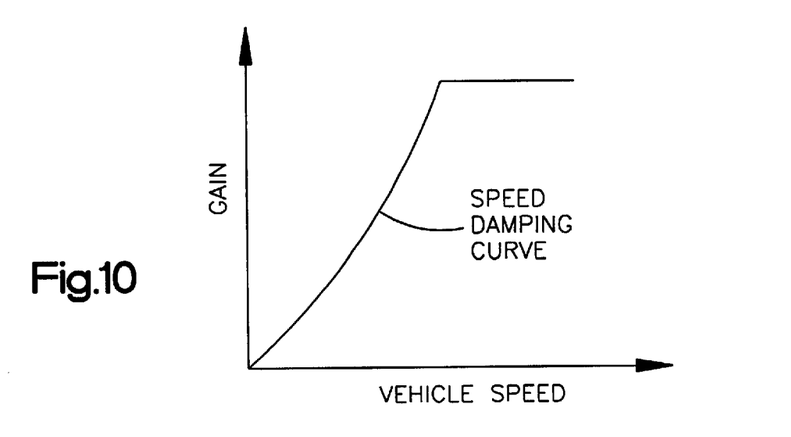
FIG. 10 is a speed damping control curve used in the system of FIG. 1.

Referring back to FIG. 1, the main controller 40 further includes a damping control circuit 202 operatively connected to the indexed vehicle velocity signal from indexer 60, the motor controller 90, and the motor velocity sensor 32. Damping of an electric assist system is known to be desirable. Such a damping control system is fully described in U.S. Pat. No. 5,623,409 to Miller, which is hereby fully incorporated herein by reference. The motor control circuit 90 modifies its determined motor control signal in response to the sensed motor velocity and the sensed indexed vehicle speed signal so as to provide damping of the motor for vehicle yaw rate control. Referring to FIG. 10, an exemplary graph of damping values are shown. When there is no damping, returnability depends on mechanical friction of the steering system and the vehicle suspension characteristics. Under full damping, over damped vehicle yaw characteristics are generated. The vehicle's stability margins are modifiable with the damping parameter.

A motor current sensor 210 is connected to the motor controller 90 and to the overseer 40. The purpose of the overseer 44 is to determine if the main controller is properly controlling the electric assist motor 28 while the main controller 40 determines whether any of the sensed parameters within predetermine tolerance values. If the overseer or main controller determines that there is a system error either due to sensor value or improper control of the operation of the electric assist motor, it opens relay 220. The vehicle can still be steered without assist through its mechanical connection between the steering wheel 12 and the steerable wheels 24, 26.

As can be seen from FIG. 1, certain operating parameters within the main controller 40 are functionally related to the value of the indexed vehicle speed signal output from the speed indexer 60. If the overseer were not to do its overseer calculations based on the same indexed vehicle speed signal, false error indications from the overseer 44 at certain vehicle velocities. This arrangement synchronizes the main controller 40 and the overseer 44 with the indexed vehicle speed signal from the indexer 60 thus permitting adjustable steering feel and preventing false error detections. All tunable parameters in the main controller 40 such as damping, gain, and filtering, and their control on the electric assist motor 28 will be accounted for in the overseer 44. The present arrangement, in accordance with the present invention, eliminates a need to have a plurality of tunable storage tables for each of the desired steering feels which are selected by switch 61.

Also, in accordance with the present invention, a switch from one steering feel setting to another using switch 61 is accomplished by smoothly transitioning from one control to the other. This is accomplished by the speed indexer gradually changing from one set value to a new set value. In effect, a change from one value to another is accomplished by ramping. This is accomplished in the speed indexer 60.

From the above description of preferred embodiments of the invention, those skilled in the art will perceive improvements, changes and modifications. For example, the main controller and the overseer have been described in the exemplary embodiment as two separate devices. It should be appreciated that both functions could be accomplished in one controller. Also, most of the function blocks shown in FIG. 1 are accomplished in software. The controller and overseer are preferably microcomputers. The present invention is applicable to any type of electric assist steering system including rack and pinion, column drive, pinion drive, etc. Such improvements, changes and modifications within the skill of the art are intended to be covered by the appended claims.

Having fully described the invention, the following is claimed:

1. An apparatus for controlling a steering assist system of the type having an electric assist motor steerably connected to steerable wheels of a vehicle, comprising:

torque sensor for providing a torque signal indicative of applied steering torque;

steering assist selector for selecting a desirable amount of steering assist;

vehicle speed sensor for sensing vehicle speed; and controller for controlling the electric assist motor in response to said applied steering torque, said sensed vehicle speed, and said steering selector by adding an indexed speed value to said vehicle speed signal in response the steering assist selector.

2. The apparatus of claim 1 further including a speed indexer connected to said vehicle speed sensor and said steering assist selector for adding a predetermined indexed vehicle speed value to the sensed vehicle speed value.

3. The apparatus of claim 2 wherein said speed indexer includes means to ramp between selected predetermined values when said speed indexer is switched from one steering assist selection to another steering assist selection.

4. The apparatus of claim 1 wherein said main controller includes dynamically varying, vehicle speed dependant tunable parameters, and wherein said apparatus further includes an overseer controller for monitoring operation of said controller, said overseer including synchronizing means for synchronizing the operation of the overseer controller with said controller relative to said vehicle speed so that said overseer accounts for the dynamically varying, vehicle speed dependant tunable parameters of said controller.

5. A method for controlling a steering assist system of the type having an electric assist motor steerably connected to steerable wheels of a vehicle, said method comprising the steps of:

sensing applied steering torque and providing a torque signal indicative of applied steering torque;

selecting a desirable amount of steering assist;

sensing vehicle speed and providing a vehicle speed signal indicative of the sensed vehicle speed; and controlling the electric assist motor in response to said sensed applied steering torque, said sensed vehicle speed, and said selected steering assist by adding an indexed speed value to said vehicle speed signal in response the selected steering assist.

* * * * *